United States Patent
McKean et al.

(10) Patent No.: US 8,200,922 B2
(45) Date of Patent: Jun. 12, 2012

(54) STORAGE SYSTEM SNAPSHOT ASSISTED BY SSD TECHNOLOGY

(75) Inventors: Brian McKean, Longmont, CO (US); Mohamad El-Batal, Westminster, CO (US); Bret S. Weber, Wichita, KS (US); John Dietterich, Rochester, MN (US); Jeffrey S Werning, Rochester, MN (US); Timothy E. Hoglund, Colorado Springs, CO (US)

(73) Assignee: Netapp, Inc., Sunnyvale, CA (US)

( * ) Notice: Subject to any disclaimer, the term of this patent is extended or adjusted under 35 U.S.C. 154(b) by 681 days.

(21) Appl. No.: 12/316,902

(22) Filed: Dec. 17, 2008

(65) Prior Publication Data

US 2010/0153620 A1 Jun. 17, 2010

(51) Int. Cl.
*G06F 12/00* (2006.01)
(52) U.S. Cl. ........................................................ 711/162
(58) Field of Classification Search .................. None
See application file for complete search history.

(56) References Cited

U.S. PATENT DOCUMENTS

| 7,949,692 B2 * | 5/2011 | Lemar et al. ............... 707/822 |
| 2005/0021565 A1 | 1/2005 | Kapoor et al. |
| 2005/0076264 A1 | 4/2005 | Rowan et al. |
| 2008/0126712 A1 | 5/2008 | Mizushima |
| 2009/0055607 A1 * | 2/2009 | Schack et al. ............... 711/162 |

OTHER PUBLICATIONS

Xiao, Weijun, et al., "Implementation and Performance Evaluation of Two Snapshot Methods on iSCSI Target Storages", , pp. 1-11.

* cited by examiner

*Primary Examiner* — Hiep Nguyen
(74) *Attorney, Agent, or Firm* — Haynes and Boone, LLP

(57) ABSTRACT

A method and apparatus for taking a snapshot of a storage system employing a solid state disk (SSD). A plurality of mapping tables in the SSD store data needed to create a one or more point in time snapshots and a current view of the SSD. In response to a write command, the SSD executes its normal write process and updates its mapping tables to indicate the current view of the SSD and additionally retains the original data in a table of pointers to the original data, as the snapshot of an earlier state of the SSD. In the preferred embodiment, the innate ability of SSDs to write data to a new location is used to perform a point-in-time copy with little or no loss in performance in performing the snapshot.

19 Claims, 5 Drawing Sheets

Current View

| Data Segment | Flash Block | Page |
|---|---|---|
| .. 80 | X | 3 |
| ... 150 | X | 7 |
| ... 175 | X | 8 |
| ... 200 | X | 1 |
| ... 210 | Y | 1 |
| 211 | Y | 2 |
| ... 500 | X | 4 |
| ... 550 | X | 5 |

Point in Time Copy Prior to Writes

| Data Segment | Flash Block | Page |
|---|---|---|
| .. 80 | X | 3 |
| ... 150 | X | 7 |
| ... 175 | X | 8 |
| ... 200 | X | 1 |
| ... 210 | X | 2 |
| 211 | X | 6 |
| ... 500 | X | 4 |
| ... 550 | X | 5 |

| Data Segment | Flash Block | Page |
|---|---|---|
| .. | | |
| 80 | X | 3 |
| .... | | |
| 150 | X | 7 |
| ... | | |
| 175 | X | 8 |
| .... | | |
| 200 | X | 1 |
| .... | | |
| 210 | Y | 1 |
| 211 | Y | 2 |
| ... | | |
| 500 | X | 4 |
| .... | | |
| 550 | X | 5 |

FIG. 5

Current View

| Data Segment | Flash Block | Page |
|---|---|---|
| .. | | |
| 80 | X | 3 |
| .... | | |
| 150 | X | 7 |
| ... | | |
| 175 | X | 8 |
| .... | | |
| 200 | X | 1 |
| .... | | |
| 210 | Y | 1 |
| 211 | Y | 2 |
| ... | | |
| 500 | X | 4 |
| .... | | |
| 550 | X | 5 |

FIG. 6A

Point in Time Copy Prior to Writes

| Data Segment | Flash Block | Page |
|---|---|---|
| .. | | |
| 80 | X | 3 |
| .... | | |
| 150 | X | 7 |
| ... | | |
| 175 | X | 8 |
| .... | | |
| 200 | X | 1 |
| .... | | |
| 210 | X | 2 |
| 211 | X | 6 |
| ... | | |
| 500 | X | 4 |
| .... | | |
| 550 | X | 5 |

FIG. 6B

STORAGE SYSTEM SNAPSHOT ASSISTED BY SSD TECHNOLOGY

CROSS-REFERENCE TO RELATED APPLICATIONS

[none]

BACKGROUND OF THE INVENTION

1. Field of Invention

The present invention relates generally to the art of flash based solid state storage.

2. Description of Related Art

RAID (Redundant Array of Independent Disks) is a storage system used to increase performance and provide fault tolerance. RAID is a set of two or more hard disks and a specialized disk controller that contains the RAID functionality. RAID improves performance by disk striping, which interleaves bytes or groups of bytes across multiple drives, so more than one disk is reading and writing simultaneously (e.g., RAID 0). Fault tolerance is achieved by mirroring or parity. Mirroring is 100% duplication of the data on two drives (e.g., RAID 1).

A volume in RAID storage system is a virtual disk drive. The volume appears as a disk drive for computer systems attached to the RAID storage systems. Volumes in RAID systems may span several physical hard drives, may be entirely contained as a portion of a single physical drive, or may be mapped across other virtual drives in the RAID system. An enclosure is a physical structure housing one or more physical disk drives. The enclosure may also contain a RAID controller or may contain storage connection hardware to enable attached computers and RAID controllers to communicate to the physical hard drives housed in the enclosure. A Logical Unit (LU) is a SCSI term for an addressable entity within a SCSI peripheral device. Volumes in RAID storage systems that are externally addressable via the SCSI protocol are typically addressed as Logical Units and assigned a Logical Unit Number (LUN) designator. Volumes in a RAID-system are therefore sometimes referred to as LUNs.

A Storage Area Network (SAN) often connects multiple servers to a multiple storage devices and storage systems. In some SANs, the storage devices themselves can copy data to other storage devices for backup without any computer processing overhead. The SAN network allows data transfers between computers and storage systems at high peripheral channel speeds.

A host adapter, also called a "controller" or "host bus adapter," it is a device that connects one or more peripheral units to a computer. The host adapter can also connect the computer to a SAN. It is typically an expansion card that plugs into the bus. SCSI, SAS, Fibre Channel, iSCSI and Infiniband are examples of peripheral interfaces that call their controllers host adapters. A host can be a computer that runs an application and accesses storage systems and devices directly attached to the computer or attached over a SAN.

Flash memory (both NAND and NOR types) is non-volatile memory. One limitation of flash memory is that although it can be read or programmed a byte or a word (NOR) at a time or at a page (NAND) at a time in a random access fashion, it must be erased a "block" at a time. Flash memory (specifically NOR flash) offers random-access read and programming operations, but cannot offer arbitrary random-access rewrite or erase operations. Another limitation is that flash memory has a finite number of erase-write cycles. Most commercially available flash products, in particular NOR types, are guaranteed to withstand around 100,000 write-erase-cycles. NAND flash comes in two types: single level cell (SLC) and multiple level cell (MLC). SLC NAND flash stores one bit per cell while MLC NAND flash can store more than one bit per cell. SLC NAND flash has write endurance equivalent to NOR flash, 100,000 write-erase cycles, while MLC clash write endurance is 10,000 write erase cycles or less. NAND Flash is Less expensive than NOR, and erasing and writing NAND is faster than NOR.

The NAND flash page is the smallest unit of memory which can be written or read, a typical size is 2048 bytes. The smallest erasable unit of flash memory is a block. A typical block contains 64 pages or 128K Bytes. NAND flash architecture was introduced by Toshiba in 1989. These memories are accessed much like block devices such as hard disks or memory cards. Each block consists of a number of pages. The pages are typically 512 or 2,048 or 4,096 bytes in size. Associated with each page are a few bytes (typically 12-16 bytes) that should be used for storage of an error detection and correction checksum. Typical block sizes include: 32 pages of 512 bytes each for a block size of 16 kiB; 64 pages of 2,048 bytes each for a block size of 128 kiB; 64 pages of 4,096 bytes each for a block size of 256 kiB; 128 pages of 4,096 bytes each for a block size of 512 kiB. While reading and programming is performed on a page basis, erasure can only be performed on a block basis.

A solid state disk or device (SSD) is a device that uses solid state technology to store its information and provides access to the stored information via a storage interface. SSDs are faster than hard disk drives using spinning platters because there is no mechanical latency, as there is no read/write head to move and no spinning disk to wait for, as in a traditional drive. SSDs are more rugged than hard disks. SSDs may use non-volatile flash memory; or, SSDs may use volatile DRAM or SRAM memory backed up by a disk drive or UPS system in case of power failure, all of which are part of the SSD system.

Traditional storage systems can execute a point-in-time copy of data in storage systems and subsystems, termed a time copy or snapshot. One purpose of the snapshot is to allow a backup operation to run while the application continues to use the current copy of data. Another use of the snapshot is to allow data mining on a copy of the data without impacting the ongoing use of the active data set. Techniques to do snapshot are "copy on write" and "redirect on write", as explained further herein.

Flash based SSDs place data on their internal physical devices according to algorithms which optimize data placement for parameters such as performance and wear leveling. These SSD maintain mapping or lookup tables that relate and translate data addresses between their logical drives or units and the physical devices within the SSD. Like RAID systems, SSDs maintain mapping or lookup tables that relate and translate data addresses between their logical drives or units and the physical devices within the SSD. In an SSD, the data in non-volatile memory is segmented into pages, with typically for a 128K block of data there exist a plurality of data segments, each holding about 2K of data. The correspondence between data (e.g., a data segment), pages, and flash blocks (an area of non-volatile memory, X, Y, Z etc) is maintained in one or more mapping tables, which may be used by hardware to lookup the correct address of data. However, in contrast to the present invention, these mapping tables only point to the current copy of the data, which is not of use for creating snapshots.

What is lacking in the prior art is a method and apparatus for an improved system to perform a time copy or snapshot for solid state devices (SSD), such as taught in the present invention.

SUMMARY OF THE INVENTION

Accordingly, an aspect of the present invention is a method and apparatus for an improved time copy or snapshot for solid state devices (SSDs).

An aspect of the present invention is to provide a time copy or snapshot that utilizes the best capabilities of an SSD.

Another aspect of the present invention is to combine the update mechanism in a flash based solid state storage device with the snapshot feature found in storage systems.

Yet another aspect of the present invention is to disclose the use of non-volatile memory, together with lookup tables, to achieve an improved method of performing a point-in-time copy or snapshot.

A further aspect of the present invention is to employ the functionality that flash-based SSDs have present in redirect-on-write and extend this functionality to include, with the addition of suitable lookup tables, the ability to make point on time snapshots of an earlier state of the SSD drive.

Another aspect of the present invention is to disclose a storage system storing data on one or more SSDs that can use a SSD based snapshot mechanism to perform and utilize a system level data snapshot on data sets stored on one or more SSDs. The system level data snapshot can be any data relating to a storage system as a whole, as is known per se in the art.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 5 is a lookup table for flash address translation such as found in the present invention after a write operation, in accordance with the present invention.

FIGS. 6a and 6b show the use of two lookup tables for flash address translation in the present invention, for both a current view and for a point-in-time copy, prior to write.

Figures 1, 2:
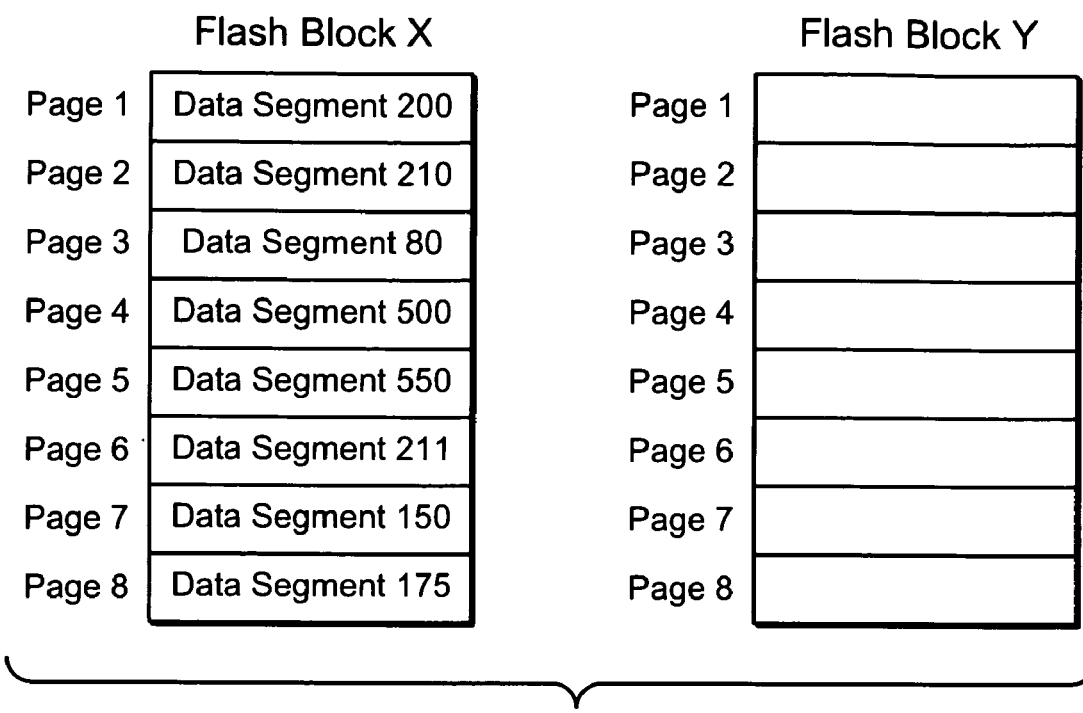
FIG. 1 shows a schematic of two flash blocks inside a flash device such as of the present invention, prior to data being written.
FIG. 2 is a lookup table for flash address translation such as found in the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The present invention is preferably firmware running in a specialized integrated circuit or ASIC. The present invention may reside in firmware, in software, in hardware, or in any combination thereof; in a controller chip, ASIC, or motherboard card, and preferably resides in the SSD itself; in any event any SSD system including the present invention comprises the SSD, whether or not the system is packaged as one unit or several units. The functions provided by the present invention would most likely be a combination of hardware and software. What kind of hardware and software would depend on the implementation. By way of example and not limitation, logical unit implementations using firmware, disc controller chip, ASIC and card are possible, as are logical units built into a Linux system with a software driver and host bus adapter.

In addition, any software tool may be employed to write and compile the present invention, which may be written in any computer language, such as C, including an object-oriented language like C++. Further, the firmware may be replaced by a general purpose computer system, such as a computer with primary and secondary memory storage. In general, depending on the language used to construct and implement the software of the present invention, the software may have any number of classes, functions, subroutines, objects, variables, templates, module(s), lines of code, portions of code and constructs (collectively and generally, and as depicted by the flowcharts herein, "a process step", "step", "instructions", "process", "block", "block step", "application", "module" or "software module") to carry out the invention in successive stages as described and taught herein, and may be either a standalone software application, or employed inside of or called by another software application. The software process or software module may be constructed so that one portion of code in the application performs a plurality of functions, as for instance in Object Oriented programming (e.g., an overloaded process). The converse is also true in that a plurality of software modules or process steps may be constructed to perform the function of a single process step described herein, without loss of generality for the present invention. At any stage of the process step of the present invention, intermediate values, variables and data may be stored for later use by the program. In general, the method and apparatus of the present invention may employ any kind of hardware to run the software embodying the present invention, not only firmware in an integrated circuit chip, but including but not limited to a personal computer, ARM processor, XScale processor, DSP, ASIC or programmable platform ASIC, FPGA, GPP, microprocessor, mainframe, dedicated circuit with memory, or any other compatible piece of hardware or virtual machine.

Turning attention to FIG. 1, the figure shows a schematic of two flash blocks inside a flash device such as of the present invention, prior to data being written.

Solid state drives using NAND technology typically do not place newly written data over previous copies of the data. With current technology the smallest amount of data that can be erased is 128K of user data. This 128K block is segmented into 2K pages that are the smallest amount of user data that can be written in an operation. An SSD typically places newly written data in a different location than previously written copy of the same data. FIG. 1 shows a simplified example. Multiple data segments have been written to flash block X. Flash block Y is erased and ready to be written. This is shown in FIG. 1, prior to data being written.

FIG. 2 is a mapping or lookup table for flash address translation such as found in the present invention. The table would relate, for the benefit of the SSD controller internal to the SSD, several pieces of information, found in the column headers of FIG. 2, comprising: which particular data (e.g. a data segment), is found in what flash block (e.g. flash block X or Y), and in what page the data is found in within the flash block (corresponding to a logical block in the SSD). Other types of information, e.g., a version number, may be also present, as this schematic is a simplified example. Tables can include pointers. From a software perspective, an "address" can be a "pointer". So a table of addresses is a table of pointers. Equivalent to tables would be any analogous structure that performs the same function; and/or any equivalent data construct comprising a variable that holds the address of another variable. Further, several pairs of tables to hold multiple snapshots at the same time are possible.

Figure 3:
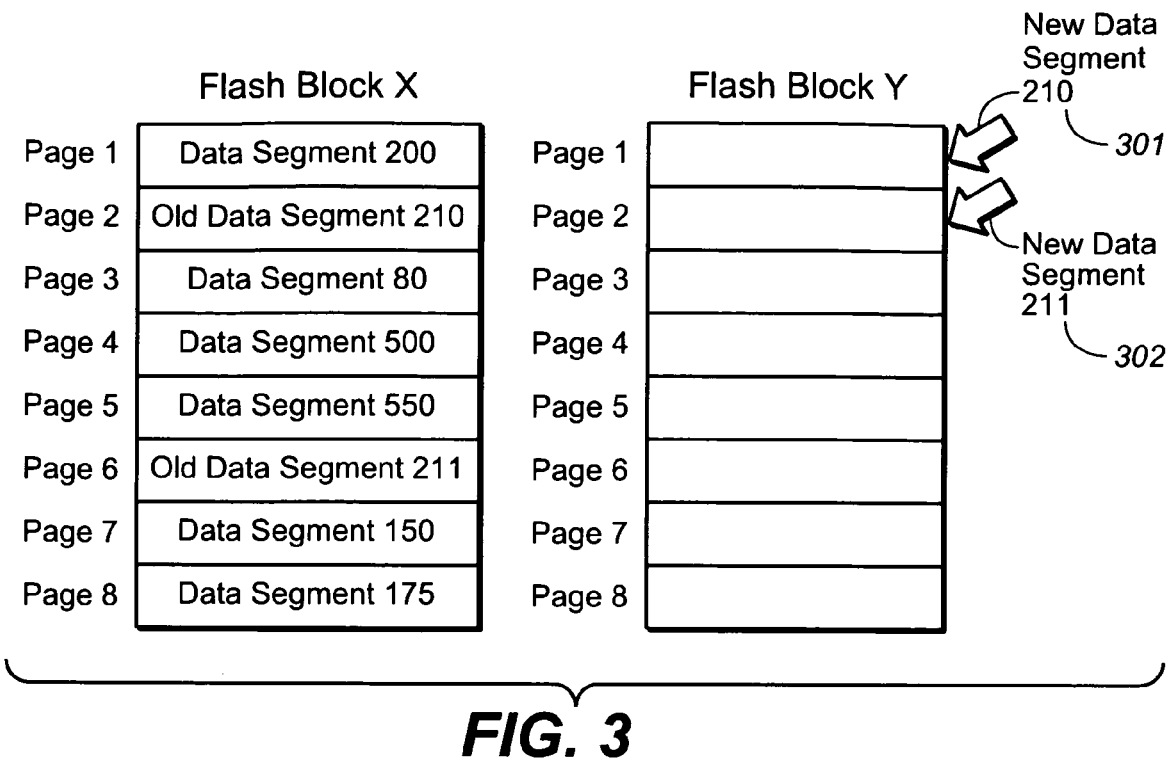
FIG. 3 shows a schematic of two flash blocks inside a flash device such as of the present invention while new data is being written.

Turning attention now to FIG. 3, there is shown a schematic of two flash blocks X, Y inside a flash device such as a SSD of the present invention while new data is being written. The flash device receives a write command from a program driven by external hardware for data segments 210 and 211, as indicated by the arrows 301, 302 labeled "New Data Segment 210" and "New Data Segment 211". The flash device accepts the new data for segments 210 and 211 and writes them to pre-erased areas of flash block Y as shown in FIG. 3 at areas shown at Page 1 and Page 2. Flash block X is unchanged. After the write to flash block Y, the pages in Flash Block X in FIG. 3 are modified to show that the data for blocks 210 and 211 in Flash Block X is now old data. This is indicated in FIG. 3 by the label "Old Data", as in "Old Data Segment 210" and "Old Data Segment 211" in Flash Block X of FIG. 3, at Page 1 and Page 6.

Figure 4:
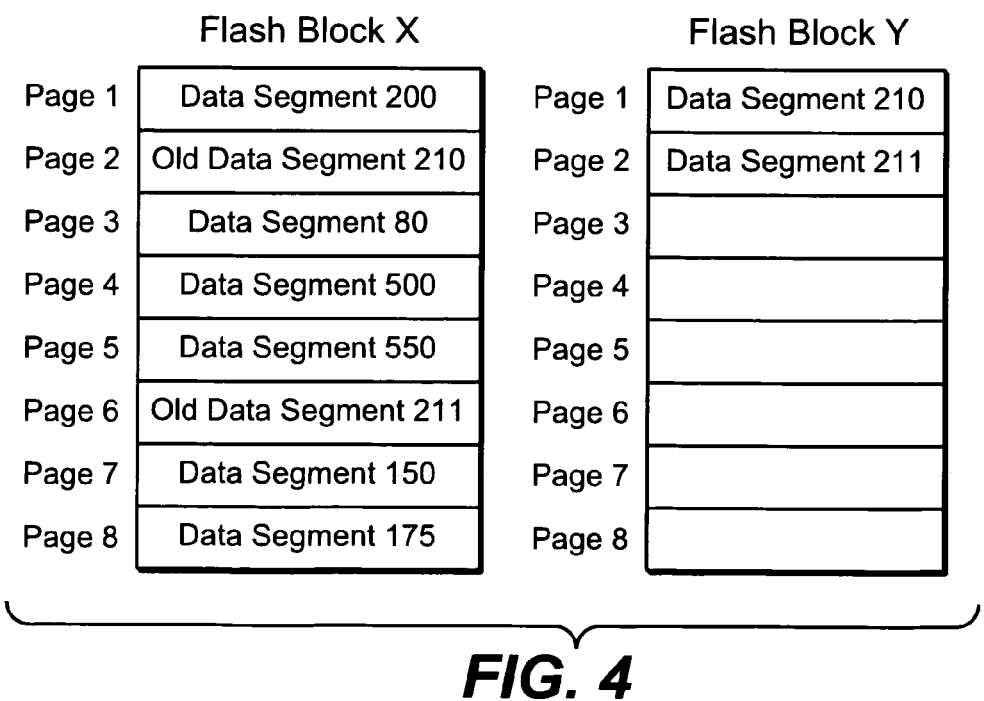
FIG. 4 shows a schematic of two flash blocks inside a flash device such as of the present invention after completion of a write operation.

FIG. 4 shows a schematic of two flash blocks inside a flash device such as of the present invention after completion of the write operation previously described. At this point the flash device will update its data mapping tables to point to Flash Block Y as the location for data segments 210 and 211. The old copies of the data segments will remain in Flash Block X until the entire Flash Block X is reclaimed and erased in preparation for reuse. The address translation tables in the flash device are then updated for the new addresses for data segments 210 and 211 and appear as shown in FIG. 5.

As is known per se, disk array subsystems support a feature called point-in-time copy or snapshot. In order to accomplish a data snapshot the array will employ either a "copy on write" or a "redirect on write" snapshot mechanism in order to preserve both the original and newly written copy of the user data. Both methods use pointers to data analogous to the flash device address translation tables. Typical snapshot methods keep a common copy of unchanged data in its original location for both the storage volume and its snapshot. The storage system will either copy old data to a new location when a write is received (the copy-on-write method) or the storage system will write the new data to the new location (the redirect-on-write method). In both cases the storage system manages the sets of data so that to a user of the storage system it appears that there is a point in time copy of the volume as well as an up to date version of the volume.

One problem with current methods for implementing snapshots at the storage system level is the large negative impact on performance. For instance, when using copy on write methods, for each write command received from the host, the storage system must read the old data from the original location, copy the old data to the snapshot location, and then write the new data to the original location. In the case of redirect-on-write snapshots at the point when the snapshot is terminated the new data on the snapshot location must be copied back into the original location.

In the present invention, since a SSD innately retains a previous copy of user data, it can be used according to the teachings of the present invention to store both current data and snapshot data, at little to no loss in performance for performing the snapshot. When modified in accordance with the teachings of the present invention, a SSD in essence executes redirect-on-write for every write command received. By adding additional address translation tables that can point to previous version of the data in the flash device with a plurality of mapping tables, the flash device can provide access to multiple point in time copies of the data stored in the device.

Thus, for the present invention, referring to the figures, a flash device receives a command to store a point in time copy of the data prior to the write of 210 and 211. The flash device retains a copy of the lookup table for addresses shown in the lookup table of FIG. 2 as the pointers to the addresses for the point in time copy. As the volume is updated, the current view of the data (the current state of the SSD, including the result of writing of data onto the SSD in response to a write command) is maintained, as shown in the flash address translation table of FIG. 5. The SSD is modified to contain two lookup tables: the flash device keeps a copy of both tables as long as it has space for the snapshot, and the snapshot is not ended via some other action. This is shown in the two tables of FIG. 6, which shows the use of two lookup tables for flash address translation in the present invention, for both a current view and for a point in time copy (a snapshot of an earlier state of the SSD), prior to write. FIG. 6(*a*) shows the address translation table after the write, similar to FIG. 5 as previously explained, while FIG. 6(*b*) shows the address translation table prior to the write action, the snapshot or point in time copy, similar to FIG. 2 as previously explained.

Figure 7:
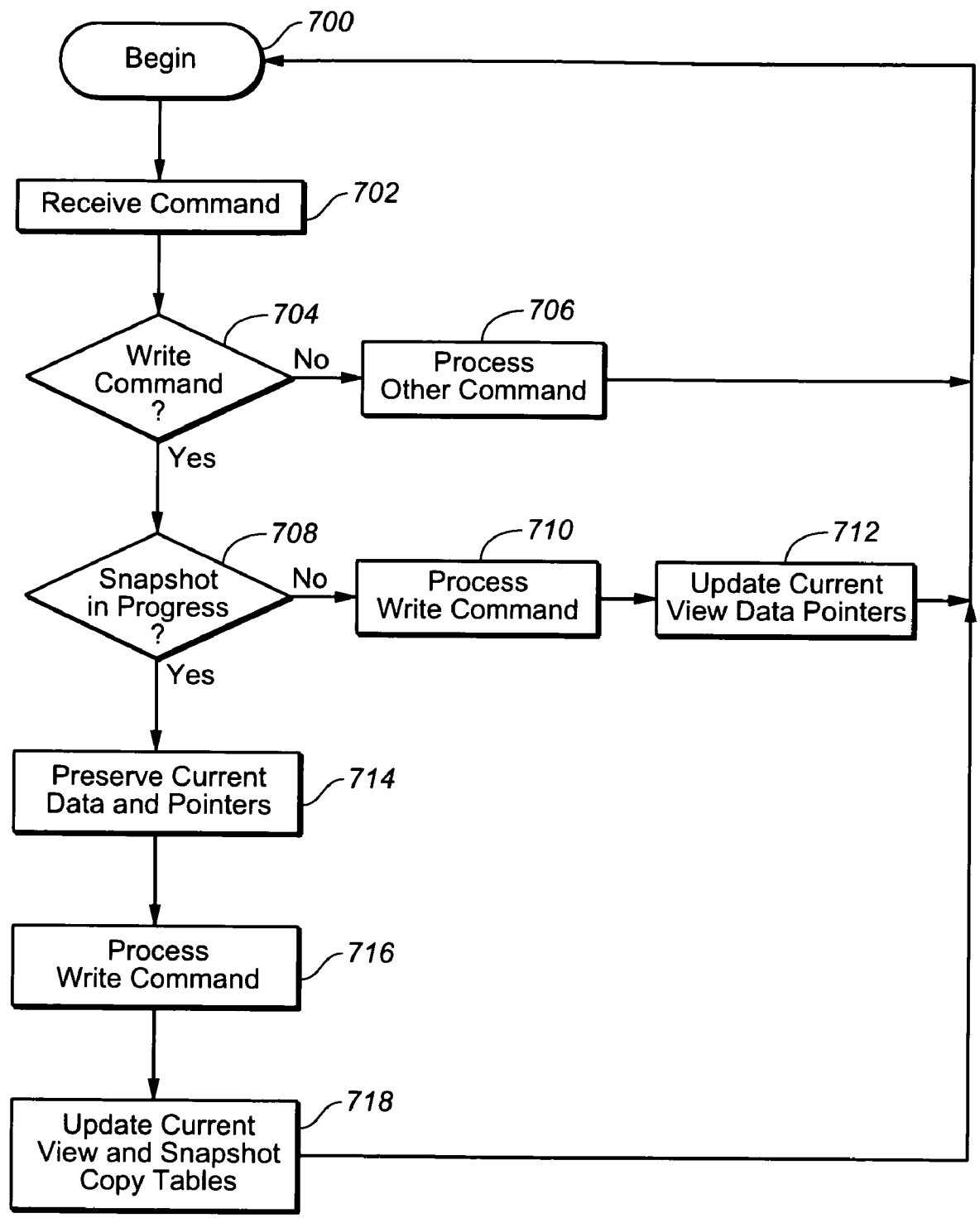
FIG. 7 is a top-level flowchart of the present invention.

FIG. 7 is a high-level flowchart of the method of the present invention. The present invention may perform the method through any combination of hardware, software and/or firmware that controls a SSD, and acts in accordance to the steps and instructions outlined herein. At step 700, labeled "Begin", the program of the present invention starts. Flow proceeds to the box 702 labeled "Receive Command", where the flash device receives a command, such as a write command, snapshot command, or other type of command, and triggers a circuit or instructions to run, and/or stores a result, or generally sets a flag or sets data indicia. The command may be a write command, or it may be a snapshot command to store a point in time copy (snapshot) of the data in the storage device. If such a snapshot command is received, a flag, data, or other data indicia is set to indicate a snapshot is to be taken; these data being set may include a signal or instructions to hardware to trigger a snapshot event. Snapshots are not as frequent as write commands; typically in a storage system a single snapshot or a few snapshots may be active at any one time.

Flow proceeds to the diamond step 704 labeled "Write Command?". Upon a SSD receiving a command, as shown in the decision diamond step 704, the flow of the program proceeds either along the "No" branch to the step box 706 labeled "Process Other Command", if the command is not a write command, or, along the "Yes" branch, if the command is a write command, to box 708 labeled "Snapshot in Progress?". At decision diamond 708, labeled "Snapshot In Progress?" a snapshot may be initiated, as further explained in connection with FIG. 8.

If a snapshot is not in progress, that is, no snapshot command has been received, flow continues along the "No" branch to step box 710 labeled "Process Write Command", where any ordinary write command (absent a snapshot) is processed, and then flow continues to the step box 712 labeled "Update Current View Data Pointers", where the data pointers of the current view of the SSD are updated, as is known per se in the art.

If, however, a snapshot is in progress, flow continues along the "Yes" branch to step box 714 labeled "Preserve Current Data and Pointers", where the flash device retains a copy of the lookup table for the addresses in the flash along the lines of FIG. 2 or FIG. 6(b), using the pointers to the addresses for the point-in-time (snapshot). The write command is then processed, as shown in step box 716 labeled "Process Write Command", and flow proceeds to step box 718 labeled "Update Current View and Snapshot Copy Tables", where the volume in storage is updated to reflect the current view (after the write) along the lines of FIG. 5 or FIG. 6(a). Using the present invention, due to the innate way a SSD operates, it is not much if any more costly in terms of performance to make a snapshot along with a write command made by the SSD. By employing two tables, it is possible to use the innate ability of SSD devices to execute a redirect on write for every write command received, and, to direct this redirect-on-write to construct a snapshot whenever necessary, at the cost of simply employing two tables, such as shown in FIGS. 6(a) and (b) and from the teachings herein.

When the two tables are thus updated, the snapshot has been achieved and control flows back to normal, to the beginning, step box 700.

Figure 8:
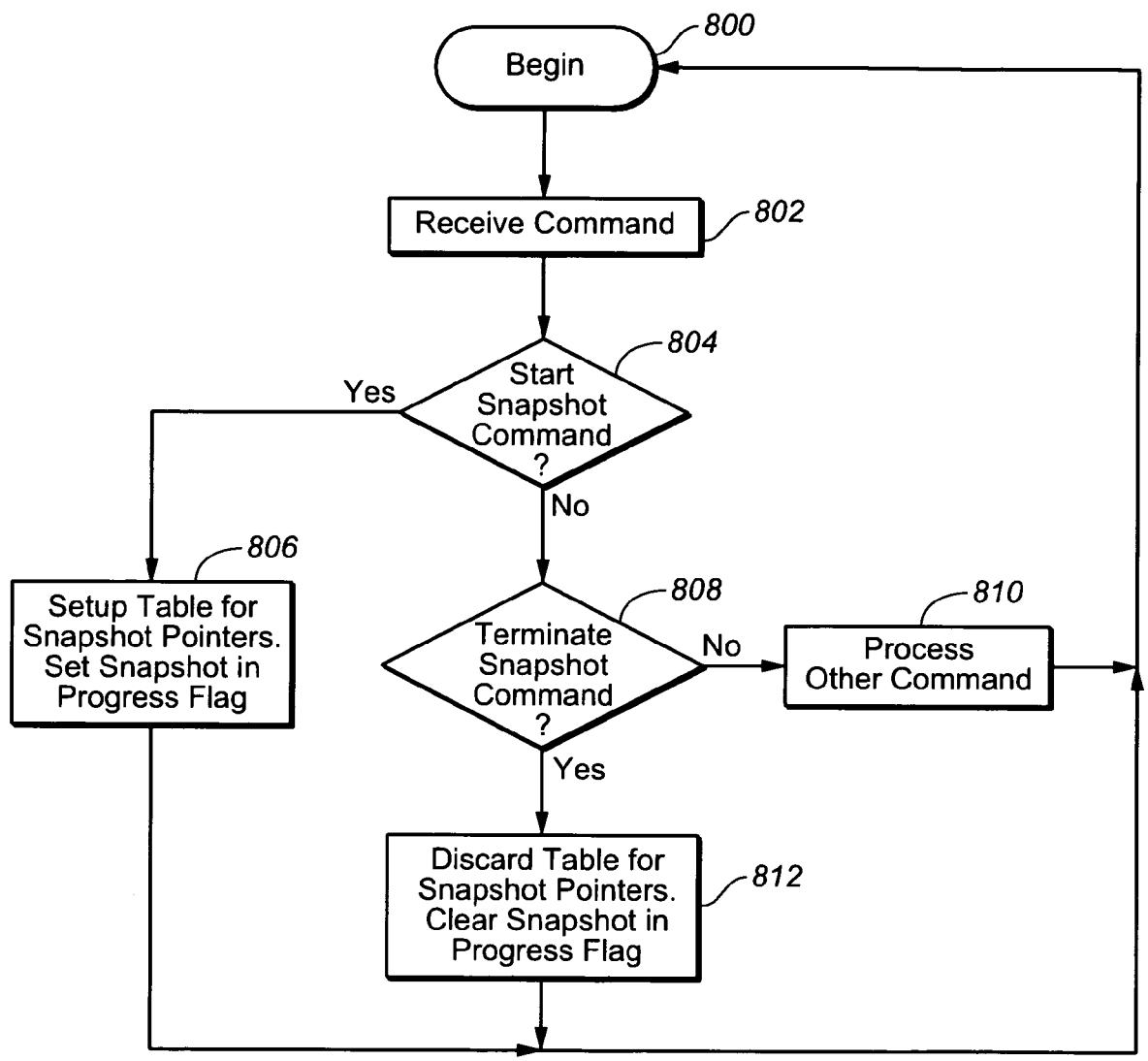
FIG. 8 is a more detailed flowchart of taking a snapshot in the present invention.

Turning attention now to FIG. 8, there is shown a more detailed but still high level flowchart of the method of taking a snapshot in accordance with the present invention. Prior to the initiation of the snapshot process the SSD maintains one table of current pointers to data as shown in FIG. 2. The method begins at step 800 labeled "Begin" and proceeds to step box 802 labeled "Receive Command", where a snapshot command is checked for, and, if such a command has been received, flow proceeds to step box 804, labeled "Start Snapshot Command", where the system of the present invention checks that a snapshot command has been received, from suitable means that set indicia (e.g. a flag or instructions) to indicate whether or not a snapshot is to be taken. If a snapshot is to be taken, flow then proceeds along the "Yes" branch to step box 806 labeled "Set Up Table For Snapshot Pointers. Set Snapshot In Progress Flag", where the steps outlined in FIG. 7, boxes 714, 716 and 718 are performed, which can include establishing a second table (FIG. 6(b)) in addition to the current view table (e.g., FIG. 6(a)). The second table (FIG. 6b) will retain pointers to the view of the data at the instant the snapshot command is processed. In addition the SSD controller will not re-use pages that are recorded in the snapshot tables.

If no snapshot command is started, flow proceeds to the step decision diamond 808, labeled "Terminate Snapshot Command?", where a command can be received to process another command, such following the "No" branch to step box 810 labeled "Process Other Command", or, if a previous snapshot has been taken but it is wished to terminate or erase it, and flow proceeds along the "Yes" branch to step box 812 labeled "Discard Table For Snapshot Pointers. Clear Snapshot in Progress Flag", where a snapshot can be terminated by discarding any table relating to the snapshot, such as discarding the table for snapshot pointers, and clearing any progress flag data, or indicia that a snapshot is in progress or that a snapshot is to be taken. The table in FIG. 6(b) is discarded and the old data in FIG. 6(b) that are not in FIG. 6(a), such as the old copies of blocks 210 and 211 in flash block X, are free to be discarded when flash block X is erased for reuse. Such steps are deemed terminating the snapshot command.

In all paths as shown in FIG. 8, flow can then return back to the beginning, box 800.

Regarding the access for the present invention, to achieve the two tables in the manner described herein, access can be provide by a number of means. For example the flash device could provide access to the point in time copy via a second logical unit in the SSD, on its device ports or via additional ports on the SSD. In another embodiment the SSD could provide access via a unique command set. A RAID system or host adapter can be provided with software or firmware that will trigger a snapshot when a specific command is rendered by the host.

Yet another aspect of the present invention is to employ the present invention in a storage system storing data on one or more SSDs, to use the SSD based snapshot mechanism of the present invention to perform and utilize a system level data snapshot on data sets stored on one or more SSDs. The system level data snapshot can be any data relating to a storage system as a whole, as is known per se in the art.

Although the present invention has been described in terms of the preferred embodiments above, numerous modifications and/or additions to the above-described preferred embodiments would be readily apparent to one skilled in the art from the teachings herein. For example, while SSDs are explicitly mentioned, any storage device that works in the same manner as an SSD can be substituted in lieu of an SSD. Further, suitable modifications to a copy-on-write storage medium could be made from one of ordinary skill if the device functions as per the teachings herein. One of ordinary skill, using the teachings herein, can even modify a traditional rotating platter hard disk drive (HDD) that uses copy-on-write to perform a function similar to the invention; this would require more work as traditional HDDs use geometry calculations, not tables, to place data, but one could place mapping table capability in them, consistent with the teachings herein, to create an embodiment of the present invention. In this case, the HDD controller would be functionally equivalent to a SSD controller, and can be thus termed as such for claim purposes, with the difference that it operates on spinning disks instead of solid-state-memory.

It is intended that the scope of the present invention extends to all such modifications and/or additions and that the scope of the present invention is limited solely by the claims set forth below.

We claim:

1. A system for taking a snapshot of a storage device comprising:
   a storage device comprising a first mapping table, the first mapping table including mapping information corresponding to data prior to a write action by the storage device, and a second mapping table, the second mapping table including mapping information corresponding to data after a write action by the storage device;

wherein the storage device is capable of a point in time copy of the storage device using the mapping information held by the first and second mapping tables.

2. The system on according to claim 1, wherein:
the storage device is a solid state disk (SSD);
the first mapping table holding data relating to a snapshot of the SSD, and the second mapping table holding data relating to current view of the SSD, wherein the SSD uses the first and second mapping tables to construct a snapshot of the SSD.

3. The system according to claim 2, wherein:
the SSD executes a write in response to a write command received and updates the first and second mapping tables with data in response to executing a write command.

4. The system according to claim 3, wherein:
the SSD executes a redirect-on-write for the write command received, and updates the second mapping table with data indicating the current view of the SSD.

5. The system according to claim 4, wherein:
the SSD updates the first mapping table with data indicating a point-in-time copy of the SSD prior to the write command, and,
a plurality of first and second mapping tables to enable the taking of multiple snapshots.

6. The system according to claim 3, wherein:
the SSD sets data to indicate a snapshot is to be taken; and,
the SSD executes a redirect-on-write for the write command received.

7. The system according to claim 6, wherein:
the SSD updates the first and second mapping tables in response to data set by the SSD indicating a snapshot is to be taken.

8. The system according to claim 7, wherein:
firmware resides in the SSD for updating the first and second mapping table; and,
a plurality of SSDs for use on a storage system storing data on at least one of the SSDs to enable the taking of a system level data snapshot on data sets stored in the SSDs.

9. The system according to claim 4, wherein:
means for setting data indicia are present to trigger a snapshot;
the SSD updates the first mapping table with data indicating a point-in-time copy of the SSD prior to the redirect-on-write; and,
the SSD updates the second mapping table with data indicating the current view of the SSD.

10. The system according to claim 9, further comprising:
a plurality of first and second mapping tables to enable the taking of multiple snapshots;
means for setting up the first and second mapping tables with pointers to data, and means for terminating a snapshot, including means for discarding a snapshot table; and,
a plurality of SSDs for use on a storage system storing data on at least one of the SSDs to enable the taking of a system level data snapshot on data sets stored in the SSDs.

11. The system according to claim 3, further comprising:
a plurality of SSDs for use on a storage system storing data on at least one of the SSDs to enable the taking of a system level data snapshot on data sets stored in the SSDs.

12. A method for a Solid State Disk snapshot comprising the steps of:
storing data on a solid date disk (SSD);
providing a first mapping table for address translation for the SSD;
providing a second mapping table for address translation for the SSD;
wherein said SSD is capable of a point in time copy of the SSD using the mapping information held in the first and second mapping tables;
storing in the first mapping table data relating to the snapshot of the SSD; storing in the second mapping table data relating to the current view of the SSD; and
constructing the snapshot of the SSD using the data in the first and second mapping tables.

13. The method according to claim 12, comprising the steps of:
executing a write command;
checking for a snapshot command, and upon receipt of a snapshot command performing the construction of the snapshot.

14. The method according to claim 13, comprising the steps of:
executing a redirect-on-write for the write command;
updating the first mapping table with data indicating a point-in-time copy of the SSD prior to the redirect-on-write;
providing the taking of multiple snapshots for use on a storage system storing data on at least one of the SSDs; and,
enabling on at least one of the plurality of SSDs the taking of a system level data snapshot on data sets stored in the SSDs.

15. The method according to claim 14, comprising the steps of:
checking for the snapshot command prior to the write command;
terminating the snapshot command; and,
providing a plurality of first and second mapping tables to enable the taking of multiple snapshots at the same time.

16. The method according to claim 12, comprising the steps of:
checking for a snapshot command;
checking for a write command, and executing a redirect-on-write for the write command;
checking for whether to start a point-in-time copy in response to the snapshot command, and performing the start in time copy if the snapshot command is received, and, terminating the snapshot command if the snapshot command is not received.

17. The method according to claim 16, comprising the steps of:
clearing data from the first mapping table in the event the snapshot command is terminated;
providing a plurality of first and second mapping tables to enable the taking of multiple snapshots at the same time; and,
updating the second mapping table with data relating to the current view.

18. The method according to claim 12, comprising the steps of:
checking for a snapshot command;
checking for a write command, and executing a redirect-on-write for the write command;
checking for whether to start a point-in-time copy in response to the snapshot command, and performing the start in time copy if the snapshot command is received;

updating the first mapping table with data indicating a point-in-time copy of the SSD prior to the redirect-on-write;

updating the second mapping table with data relating to the current view in the event a snapshot copy is received; and, providing a plurality of first and second mapping tables to enable the taking of multiple snapshots at the same time.

19. A system for taking a point-in-time copy of a SSD storage system comprising:

means for storing data comprising a SSD;

said SSD storage means having means for address translation comprising a first lookup table, said first lookup table holding data relating to a point-in-time copy of the SSD;

said SSD storage means having means for address translation comprising a second lookup table, said second lookup table holding data relating to the current view of the SSD;

means for writing data, said data writing means comprising means for executing a redirect-on-write;

wherein, said SSD uses the first and second lookup tables to construct a snapshot of the SSD;

means for setting data indicia to indicate whether to take a snapshot;

means for updating said first and second lookup tables, with data pointers, in response to said data indicia setting means indicating to take a snapshot;

a plurality of first and second lookup tables on a plurality of SSDs to enable the taking of multiple snapshots;

means for enabling on at least one of said plurality of SSDs the taking of a system level data snapshot on data sets stored in said SSDs; and, means for terminating snapshot data in response to a command to terminate a snapshot.

* * * * *